United States Patent
Gulliksen

(10) Patent No.: US 6,691,123 B1
(45) Date of Patent: Feb. 10, 2004

(54) METHOD FOR STRUCTURING AND SEARCHING INFORMATION

(75) Inventor: Kenneth Gulliksen, Fredrikstad (NO)

(73) Assignee: IMP Technology AS, Fredrikstad (NO)

( * ) Notice: Subject to any disclaimer, the term of this patent is extended or adjusted under 35 U.S.C. 154(b) by 392 days.

(21) Appl. No.: 09/709,279

(22) Filed: Nov. 13, 2000

(30) Foreign Application Priority Data

Nov. 10, 2000 (NO) .......................................... 2000 5704

(51) Int. Cl.$^7$ .............................................. G06F 17/30
(52) U.S. Cl. ........................................................ 707/101
(58) Field of Search ............................. 707/2, 3, 5, 10, 707/9, 100, 101, 102, 200, 201; 382/195; 711/5; 717/117

(56) References Cited

U.S. PATENT DOCUMENTS

| 5,752,025 A | 5/1998 | Shakib et al. ................ 707/102 |
| 5,918,225 A | 6/1999 | White et al. ..................... 707/3 |
| 6,094,649 A * | 7/2000 | Bowen et al. .................. 707/3 |

FOREIGN PATENT DOCUMENTS

WO 96/09589 3/1996

OTHER PUBLICATIONS

Sudarshan et al., Database System Concepts, 1998, ISBN 0-07-031086-6.*

* cited by examiner

*Primary Examiner*—Diane D. Mizrahi
*Assistant Examiner*—Apu M Mofiz
(74) *Attorney, Agent, or Firm*—Wenderoth, Lind & Ponack, L.L.P.

(57) ABSTRACT

A system for structuring digitally stored information and methods for searching the resulting structure are described. The structuring system comprises a database comprising a number of cells arranged in rows and columns for holding pieces of data representing the information. Only one piece of data may be stored in each cell and the pieces of data contained in cells in one row of the database constitutes a certain information. This information may be files on a computer hard disk, pages on the www etc. An index for each unique piece of data occurring in the database, where each index table providing information concerning all locations of that unique piece of data in the database, a main index listing once all the unique pieces of data in the database together with a corresponding index table identifier, the index table identifier providing a link to the corresponding index table for that particular piece of data, are also necessary elements in the structuring system, The structure of the database/index system in itself provides fast and simple access to the information contained therein. The information structuring system and the methods for structuring and searching digitally stored information may e.g. be used in a search engine for the Internet, in a mobile phone, WAP or as a search system for retrieving files and controlling the information stored in a LAN or computer hard disk.

22 Claims, 7 Drawing Sheets

| ID | 20 | 19 | 18 | 17 | 16 |
|----|----|----|----|----|----|
| 50 | | | | | |
| 51 | | | | | |
| 52 | | | | | |
| 53 | | | | | |
| 54 | | | | | |
| 55 | | | | | |
| 56 | | | | | |
| 57 | | | | | |
| 58 | | | | | |

FIG. 2

| ID | WORD | X | Y |
|----|------|-----|----|
| 1  |      | -19 | 85 |
| 2  |      | -19 | 86 |
| 3  |      | -18 | 90 |
| 4  |      | -18 | 91 |
|    |      |     |    |
|    |      |     |    |
|    |      |     |    |

FIG. 3

| ID | criteria | firstref |
|-----|----------|----------|
| 110 | journals | journals_1 |
| 111 | k_12 | k_12_1 |
| 112 | landing | landing_1 |
| 113 | league | league_1 |
| 114 | literature | literature_1 |
| 115 | looted | looted_1 |

| NAME |
|---|
| x001x012x002x001x005x002x003 |
| x001x012x002x001x006 |
| x001x012x002x001x007 |
| x001x012x002x001x007x001 |
| x001x012x002x001x007x002 |
| x001x012x002x001x007x003 |
| x001x012x002x001x007x004 |
| x001x012x002x001x008 |

FIG. 5

| | | | |
|---|---|---|---|
| art | history | art | arts | 001.001.002 |
| art | history | art | humanities | 001.001.002 |
| artists | history | art | arts | 001.001.003 |
| artists | history | art | humanities | 001.001.003 |
| artists | history | art | arts | 001.001.003.001 |
| artists | history | art | humanities | 001.001.003.001 |
| artists | history | art | arts | 001.001.003.001.001 |
| periods | history | art | arts | 001.001.012.002.001.017.003.012.001 |
| periods | history | art | humanities | 001.001.012.002.001.017.003.012.001 |
| periods | history | art | arts | 001.001.012.002.001.017.003.012.002 |
| periods | history | art | humanities | 001.001.012.002.001.017.003.012.002 |
| periods | history | art | arts | 001.001.012.002.001.017.003.012.002.001 |
| periods | history | art | humanities | 001.001.012.002.001.017.003.012.002.001 |

FIG. 6

| ID | 20 | 19 | 18 | 17 | 16 |
|----|-----|-----|-----|-----|-----|
| 71 | <NULL> | <NULL> | <NULL> | <NULL> | programs |
| 72 | <NULL> | <NULL> | <NULL> | <NULL> | programs |
| 73 | <NULL> | <NULL> | <NULL> | <NULL> | <NULL> |
| 74 | <NULL> | <NULL> | <NULL> | <NULL> | <NULL> |
| 75 | <NULL> | <NULL> | <NULL> | <NULL> | <NULL> |
| 76 | <NULL> | <NULL> | <NULL> | <NULL> | <NULL> |
| 77 | <NULL> | <NULL> | <NULL> | <NULL> | <NULL> |
| 78 | <NULL> | <NULL> | <NULL> | <NULL> | <NULL> |
| 79 | <NULL> | <NULL> | <NULL> | <NULL> | <NULL> |
| 80 | <NULL> | <NULL> | <NULL> | <NULL> | <NULL> |
| 81 | <NULL> | <NULL> | <NULL> | <NULL> | <NULL> |
| 82 | <NULL> | <NULL> | <NULL> | <NULL> | <NULL> |
| 83 | <NULL> | <NULL> | <NULL> | <NULL> | <NULL> |
| 84 | <NULL> | <NULL> | <NULL> | assault | amphibious |
| 85 | <NULL> | landing | amphibious | assault | amphibious |
| 86 | <NULL> | landing | amphibious | assault | amphibious |
| 87 | <NULL> | <NULL> | <NULL> | <NULL> | battleships |

FIG. 7

| ID | WORD | x | y |
|---|---|---|---|
| ▶ 1 | <NULL> | -19 | 85 |
| 2 | <NULL> | -19 | 86 |
| 3 | <NULL> | -18 | 90 |
| 4 | <NULL> | -18 | 91 |
| * | | | |

FIG. 8

| ID | criteria | firstref | secondref |
|---|---|---|---|
| 110 | journals | journals_1 | journals_2 |
| 111 | k_12 | k_12_1 | k_22_2 |
| ▶ 112 | landing | landing_1 | landing_2 |
| 113 | league | league_1 | league_2 |
| 114 | literature | literature_1 | literature_2 |
| 115 | looted | looted_1 | looted_2 |
| 116 | magazines | magazines_1 | magazines_2 |
| 117 | manuscripts | manuscripts_1 | manuscripts_2 |
| 118 | marine | marine_1 | marine_2 |
| 119 | marines | marines_1 | marines_2 |
| 120 | maritime | maritime_1 | maritime_2 |

FIG. 9

| ID | WORD | x | y |
|---|---|---|---|
| 1 | <NULL> | -13 | 94 |
| 2 | <NULL> | -13 | 95 |
| 3 | <NULL> | -11 | 212 |
| 4 | <NULL> | -11 | 226 |
| 5 | <NULL> | -9 | 279 |
| 6 | <NULL> | -9 | 280 |
| 7 | <NULL> | -8 | 24 |
| 8 | <NULL> | -8 | 25 |
| 9 | <NULL> | -8 | 26 |
| 10 | <NULL> | -8 | 27 |
| 11 | <NULL> | -8 | 28 |
| 12 | <NULL> | -8 | 29 |
| 13 | <NULL> | -8 | 30 |
| 14 | <NULL> | -8 | 31 |

FIG. 10

| ID | WORD | x | y |
|---|---|---|---|
| 1 | <NULL> | -8 | 24 |
| 2 | <NULL> | -8 | 25 |
| 3 | <NULL> | -8 | 26 |
| 4 | <NULL> | -8 | 27 |
| 5 | <NULL> | -8 | 28 |
| 6 | <NULL> | -8 | 29 |
| 7 | <NULL> | -8 | 30 |
| 8 | <NULL> | -8 | 31 |
| 9 | <NULL> | -8 | 32 |
| 10 | <NULL> | -8 | 33 |
| 11 | <NULL> | -8 | 34 |
| 12 | <NULL> | -8 | 35 |
| 13 | <NULL> | -8 | 61 |
| 14 | <NULL> | -8 | 62 |

METHOD FOR STRUCTURING AND SEARCHING INFORMATION

FIELD OF THE INVENTION

The present invention relates to a system and method for structuring digitally stored information and a method for searching this information. A computer program product and uses of the system and methods are also disclosed, Especially, the invention addresses the problem of searching large information spaces/databases, like e.g. a national telephone directory, large file systems or the Internet.

DESCRIPTION OF THE PRIOR ART

The existing and increasing amount of information available today in an electronic form, places heavy demands on computer hardware as regards to e.g. memory capacity and processor speed when searching in this information. Information in electronic form is e.g., network versions of telephone directories, files stored on computer hard disks or on network servers (e.g. LAN, WAN, www pages. The digital information may be organized and stored in large databases, and retrieving information from these structures requires complex search routines, powerful processors and storage capacity. However, it may still be a time consuming and tedious process to retrieve information as desired from these databases.

For Internet, which is a very large information space, various search engines and searchable directories (like Yahoo) have been developed for searching and retrieving the existing information. The information is then indexed and arranged in searchable format, e.g., databases, and stored on servers. A problem with such prior art search engines and searchable directories are the need of large physical storage capacity. All the indexed and/or processed information is physically stored, and searching all this information often arranged in one huge database, is not always very efficient.

A binary search, which is often utilized when searching database structures, is a search algorithm that repeatedly divides an ordered search space in half according to how the required value compares with the middle element. When searching large databases, this becomes a time consuming process, as the entire database must be searched at least once. Usually, searches are performed in selected columns in the database only. If it is necessary to combine information arranged in different columns in the database for achieving a usable and meaningful search result, and the database is large, the search procedure may take a very long time, and is sometimes not performable due to the huge number of possible combinations of the information arranged in the cells in the different columns. How this information should be presented for the user in a usable and meaningful manner is also a problem if a search request, in e.g. a database or any another information space, results in large amounts of hits. Searching is often elaborate and contrasts with users always demanding information presented in an instant.

SUMMARY OF THE INVENTION

The present invention has been conceived to solve, or at least alleviate, the problems of the prior art as described above. Thus, in accordance with a first aspect of the present invention there is provided a system for structuring digitally stored information, the system being included in a data processing system. The structuring system comprises: a database comprising a number of cells arranged in rows and columns for holding pieces of data representing the information, wherein only one piece of data may be stored in each cell, the pieces of data contained in cells in one row of the database constituting a certain information; an index for each unique piece of data occurring in the database, each index table providing information concerning all locations of that unique piece of data in the database; and a main index listing once all the unique pieces of data in the database together with a corresponding index table identifier, the index table identifier providing a link to the corresponding index table for that particular piece of data.

The locations may be expressed by coordinates, the coordinates defining the cells in the database. Preferably the coordinates are (x, y) coordinate pairs respectively representing the columns and rows in the database. The coordinate pairs in the index tables are then first sorted according to the absolute value of the x coordinates and second according to the value of the y coordinate. The pieces of data with the highest absolute values of x have by definition a higher relevance than pieces of data with lower absolute values of x. By relevance means that the pieces of data found to best describe the represented information are assigned a high x value. In one embodiment the database may also comprise an address or link to the digitally stored information represented by the pieces of data contained in each row in the database.

The pieces of data contained in cells in one row in the database may represent a search string associated with an URL address or a file path. The digitally stored information may represent a telephone directory.

In a second aspect, the invention provides a method in a data processing system for structuring digitally stored information. The method comprises: processing the information in a data processing, unit and storing pieces of data representative of the information in cells in a database, the cells in the database being arranged in rows and columns, all the cells in the same row in the database constituting a certain information; creating at least one index for each unique piece of data occurring in the database comprising information of all locations of the unique piece of data in the database; and creating a main index listing once all the unique pieces of data occurring in the database together with a corresponding index identifier providing a link to the corresponding index for a unique piece of data.

In a first embodiment of the invented method, an indexing agent is used for indexing the stored information. This indexing agent may be a spider, web crawler or any other suitable agent. Preferably, the information is processed and the pieces of data representative of the information arranged in the database in such a way that pieces of data assigned high absolute values of the x coordinates are more descriptive for the represented information than pieces of data assigned lower absolute values of the x coordinates. The pieces of data may be keywords describing the digitally stored information. When the keywords contained in cells in each row in the database constitute a search string, the method further comprises creating an index for each position a unique keyword occurs in the search strings, and creating a corresponding index identifier associated with the keyword in the main index. A resource locator for the processed information may be included in each row in the database, providing a link to the digitally stored information.

In a third aspect, the invention provides a method in a data processing system for searching digitally stored information, wherein the information is structured in a database/index system as defined above. The method comprises: inputting a desired information through an interface; searching the main index table selecting pieces of data corresponding to the desired information and thereby selecting index tables; searching the selected index tables selecting at least one location of a cell in the database containing the desired information; and selecting the row in the database in which the cell is located and retrieving the desired information.

In one embodiment, when the desired information is expressed in the form of a sequenced keyword search string, the method further comprises determining the order of the keyword in the sequence of keywords, and selecting index tables corresponding both to the desired information and the order of the keyword in the input search string.

The desired information may be input through a search engine interface, and the retrieved information displayed in a display device. A typical display device is may be a computer screen, but also the display on a mobile phone or WAP.

In a forth aspect the invention provides a computer program product for a data processing system, comprising a computer readable medium, having thereon computer readable program means, which when loaded into an internal memory of a data processing system, makes the data processing system perform the structuring method as defined above.

In a fifth aspect the invention also provides a computer program product for a data processing system, comprising computer readable code means which, when loaded into an internal memory of a data processing system, makes the data processing system perform the search method as defined above.

The invented system and methods may be used in a search engine for searching the Internet, in a handheld electronic device comprising a processor and memory (e.g. a mobile phone, a WAP phone or a portable computer) or in a computer for retrieving files in a data storage device. The invention provides a solution for organizing and searching information in an efficient manner, and presenting the information in an instantly usable way. The invented solution provides faster processing by minimising the search itself, and also results in reduced costs for running and upgrading the search system. Information can easily be added and deleted, and provided independent of the search language used. The invention is defined in the appended claims.

BRIEF DESCRIPTION OF DRAWINGS

The above and further advantages may be more fully understood by referring to the following description and accompanying drawings of which:

FIG. 2 is an extract of a main index table according to an embodiment of the present invention;

FIG. 3 is a part of an index table according to an embodiment of the present invention;

FIG. 4 is an extract of a list with IMP numbers, each IMP number representing a string of search terms, according to an embodiment of the invention;

FIG. 5 shows a right part of a content database with search strings represented both by words and IMP numbers according to an embodiment of the invention;

FIG. 6 shows a left part of the content database in FIG. 5 and with the row and column coordinates displayed;

FIG. 7 is a part of an index table for the word "landing" according to an embodiment of the invention:

FIG. 8 is an extract of a main index table according to an embodiment of the invention;

FIG. 9 is a first part of an index table for a word in the firstref column shown in FIG. 8; and FIG. 10 is a part of an index table for a word in the secondref column shown in FIG. 8.

DESCRIPTION OF THE INVENTION

Figure 1:
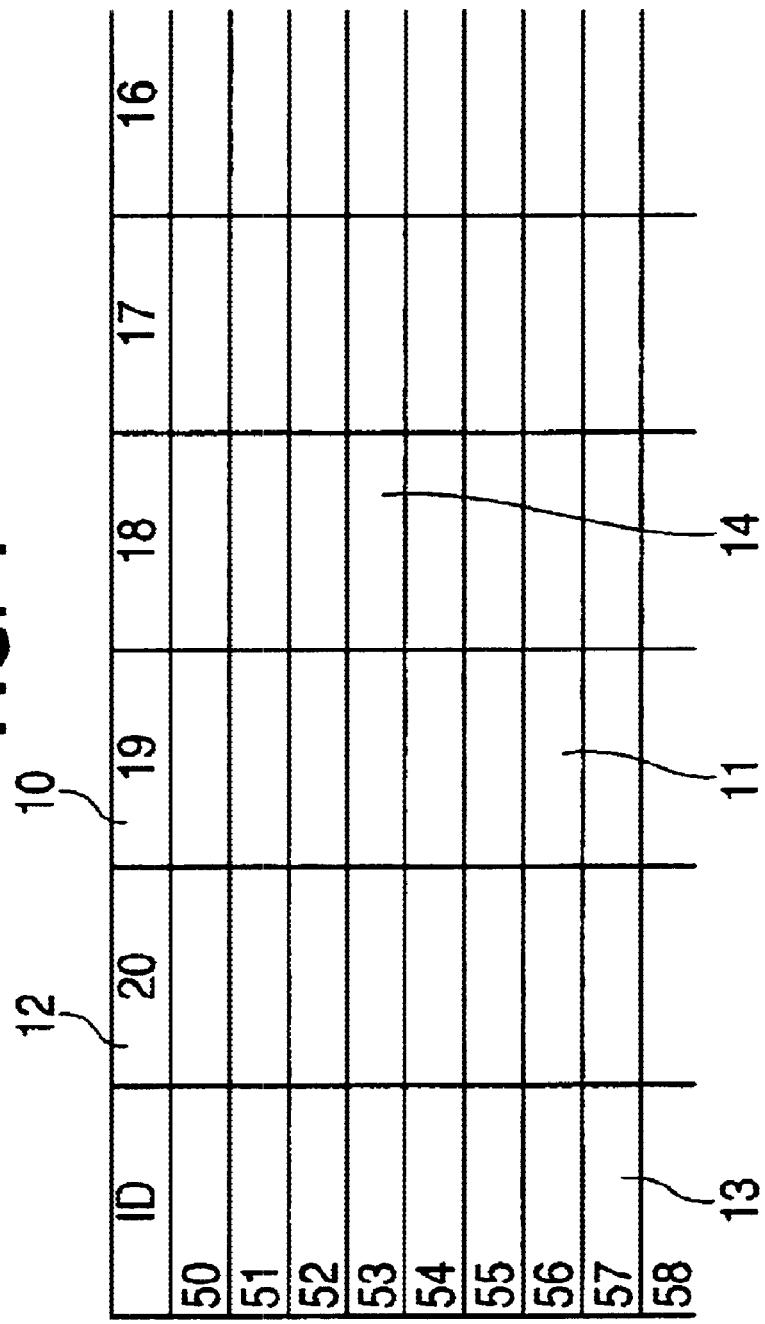
FIG. 1 shows an extract of a left part of a content database according to an embodiment of the present invention.

The present invention relates to a system of databases and indexes capable of storing huge amounts of information, a method for processing and structuring digitally stored information in such a structure and a method for searching the database structure. The invention will first be described in a generalized way and then by the use of examples of possible implementations of the invention. The examples shall however not be considered limiting for the scope of the invention.

Information in the context of the present invention shall be understood in the widest sense, but the information must exist in some sort of electronic form, e.g. in a processor, memory means or storage device. Information may be a Word or Excel file in a computer hard disk, listings in an online telephone directory, pages on the World Wide Web, etc. The information is in the present invention is processed in known ways for extracting pieces of data representative for the information. These known methods include, but are not limited to, e.g. counting the occurrences of words in pages on the www or in a stored file, and using descriptive words with the highest number of occurrences as pieces of data representative of the information. According to the invention, the extracted data are then arranged in a database structure, e.g. as shown in FIG. 1, and different indexes created for facilitating the retrieval of the information. The database structure and data are physically stored in some sort of storage device. Data in this context may be e.g. words, letters, symbols, numbers or digits etc.

The Database Structure

FIG. 1 shows an extract of a content database 10, with cells 11 arranged in horizontal rows and vertical columns. Each cell 11 in the database is identified by a (x,y) coordinate pair, the numbers in the top row being the x coordinates and the numbers in the leftmost column being the y coordinates. Accordingly, the cell 14 in FIG. 1 is identified by the (x, y) coordinate pair (18, 53).

The data pieces representing the information are arranged in the content database in such a way that data pieces describing certain information appear in the same row. As an example, a record in a telephone directory usually consists of last name, first name, address and telephone number. This information will therefore occur in the same row. Also, each cell in the content database can only contain one piece of data, i.e. a continuous sequence of letters, numbers etc. However, in this embodiment of the invention, if a person has first name "Hans Frode", the entire first name will appear in one cell. There is no limitation on the number of letters, numbers etc. in the continuous sequence, and cells need therefore not be divided.

Data are also arranged in the rows in the content database according to relevance. When processing the information in a computer processor, extracting the data to be included in the content database, data considered very descriptive of the information, i.e. data precisely defining what this information (e.g. file/document/www page) is all about, are arranged in the cells in a row in such a way that these data are assigned the highest absolute values of x. This means that the descriptive data either occurs to the very left or the very right in the content database, dependent on how the x coordinates are assigned to the columns.

All the cells in the database in FIG. 1 need not be filled with a piece of data. The number of pieces of data necessary for adequately representing a certain information may vary. Rows and columns in the content database can easily be added and deleted in known ways for dynamically expanding and decreasing the database when desired. The content database may be expanded almost infinitely.

The database can in one embodiment also include the information address, e.g. an URL address for a www page. The address data is stored in one predefined column in a variety of ways, as e.g. a numerical representation with a link to an address index/database or an html link to an URL address.

Figure 2:
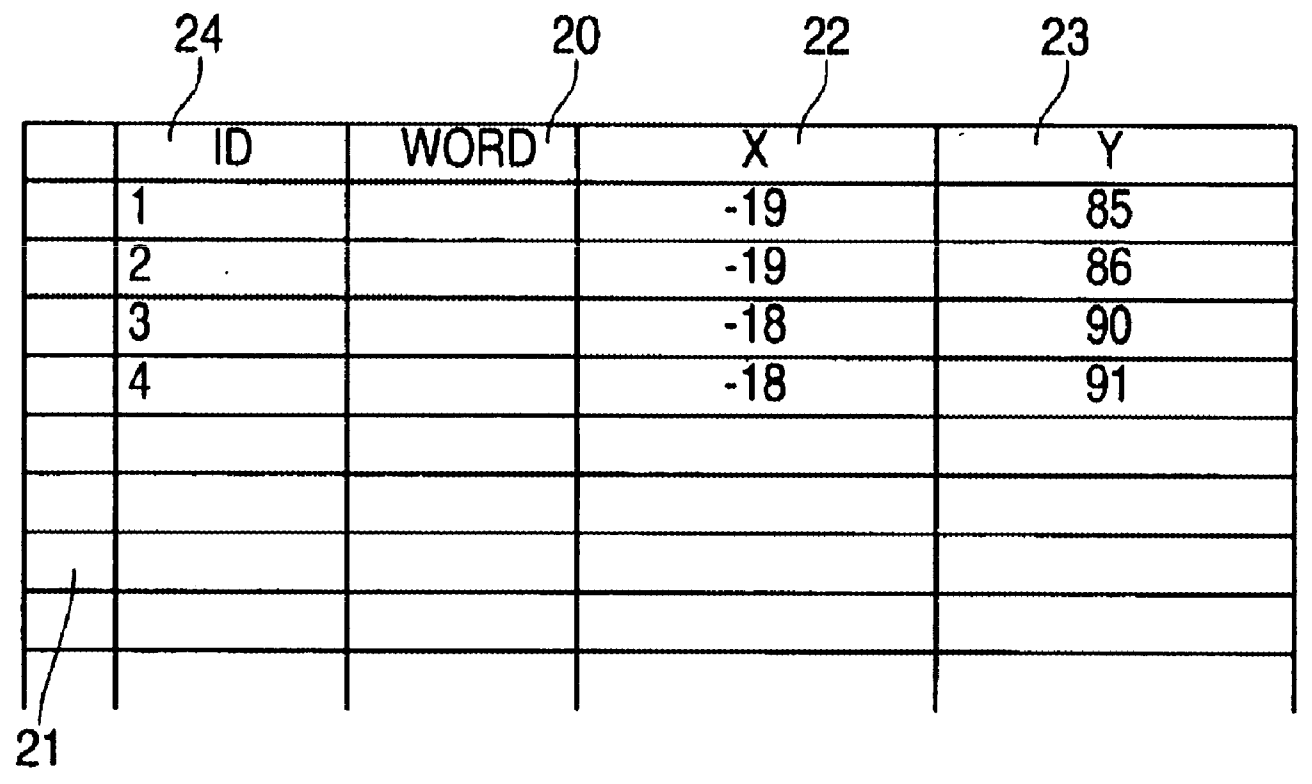

The same piece of data (e.g. words or numbers) may occur in many different locations in the content database in FIG. 1. Thus, all the coordinates for all these unique pieces of data occurring in the content database are extracted and arranged in indexes. An index table exists for each unique piece of data occurring In the content database. An embodiment of such an index table 20 for a unique piece of data is shown in FIG. 2. The x, y coordinate pairs are listed in the same row 21, with the x coordinate in column 22 and the y coordinate in column 23. The coordinate pairs in index table 20 in FIG. 2 are first sorted in descending order according to the absolute value of the x coordinate, and second in ascending order according to the coordinate values of the y coordinates. The coordinate pairs representing the locations in which the unique piece of data is most descriptive of the represented information are therefore at the very top in the index tables. The column 24 called ID only identifies the number of different locations for the piece of data in the content database.

To be able to find the appropriate index table for a certain piece of information, all the unique pieces of data are arranged in a main index, together with information concerning which index table includes the coordinate values for this data in the content database. A number of such main indexes may be created dependent upon the size of the content database. Examples: From a content database with 200 000 rows and 10 columns one main index (wordlist) is generated. The size of the main index will depend upon the number of unique pieces of data (words) in the content database. A content database comprising information relating to technical features of car models will result in a rather small main index, as the same words often will be repeated describing the different car models. The indexes providing the coordinate values, will however be large. Accordingly, a content database relating to phone number information will result in a rather large main index, and it may then be favorable to create a number of main indexes. When several main indexes are created, higher level tables are created for identifying the appropriate main index tables. Reducing the size of the index table in this way will result in increased search speed and easy retrieval of data when later searching the structure.

The way in which the information is preprocessed and structured, provides a system where searches may be considered as performed in advance. The actual searches ordered by users of the search system are then performed in the structured preperformed searches. This considerably minimizes the search process.

An embodiment of a main index table 30 is shown in FIG. 3. Note that only an extract of such a main index is shown in FIG. 3. The column 31 named ID gives the number of rows in the main index and hence the number of different pieces of data, e.g. words, existing in the content database. Column 33, criteria, lists the different pieces of data. In FIG. 3, the pieces of data are words sorted alphabetically. The main index may be regarded as some sort of word list for the database system. The corresponding index identifier for each piece of data is listed in column 34.

Searching the Database Structure

The information desired is inputted to the search system through an interface. This interface is e.g. a search engine residing on a personal computer for searching the Internet, a search module for searching files stored on servers in an intranet structure, a mobile phone for searching information regarding telephone numbers stored in the memory etc. If the desired information is input in the form of a keyword search string, which would be the typical case for an Internet application, the search system will first perform a search in the main index table finding the pieces of data matching the input keyword, Then, the index table identifier assigned to that piece of data will be selected. If no match between the input keywords and the pieces of data in the main index occurs, no hits are listed in the hit list.

The index table identifier provides a link to the index table to be searched for finding the locations of the piece of data, and thereby the input keyword, in the content database. All the coordinate pairs for the selected piece of data are retrieved from the index table. The coordinate pairs are the locations of all the cells in the content database containing the input keyword. The entire rows in the content database containing the identified cells are then selected. In some implementations of the invention, the content database itself holds all the information desired by the user, typically when the database structure holds information concerning phone numbers and addresses. The rows may also contain information concerning the location of the desired information, e.g. an URL address for a page on the web. In the last mentioned case, having the coordinates for the cells in the content is database, instantly implies having the URL addresses for the information sought by a person searching the web. Finding a cell location in the index table results in selecting the entire row in the content database containing the cell, as the y coordinate in the (x, y) coordinate pair identifies the row. The cell in the row holding the URL address information is then easily identified, as the column holding the address information is predefined.

Known methods are used for searching the indexes and extracting the information. The size of the indexes are kept small, and well known search methods like a binary search, can therefore be used. The favorable search speed is above all due to the simplicity of the system. Extracted data are stored in cells identified by coordinates and information concerning the unique data, and coordinate positions are stored in small index tables providing immediate localization of the input keywords in the content database.

The system may be designed to go directly to an address and open the document. Another option is to display the pieces of data stored in the content database for the information seeker and leave the decision of opening the found information to the user. A search may result in a huge number of hits. The search system displays the information found according to its relevance for the input keywords. Relevance is an inherent characteristic of the system as the database structure and indexes are created taking account of the relevance as previously explained.

Implementations of the System

The program can process information already stored in a memory, hard disk or server, and run whenever new information is input or deleted from the information space, for adding this new information to the database/index structure or deleting rows in the database/indexes respectively. An intranet can be considered to be such an information space, and the program will then process and store all the information, documents, programs etc. existing on the different servers, work stations, printers etc. constituting the intranet, as extracted pieces of data representative of the information, or as file paths to documents or programs. The database Is system provides a rapid and efficient tool for finding the information existing in a network. The program can also be installed and run on personal computers as a fast and efficient file management system or on handheld electronic notebooks and mobile phones for storing and searching the information existing in these devices.

EXAMPLE 1

Typically, a telephone directory contains name, address and phone number information, but also profession and other additional information. Yellow pages may contain a lot of additional information, e.g. certificate of apprenticeship, work-force, work hours etc. All information concerning a subscriber is stored in one row in the content database. The information in the content database is then processed and coordinate information concerning each unique piece of data, is retrieved and stored in indexes set up for the purpose as explained above. At least one index is assigned each one of the unique pieces of data. The unique pieces of data are also retrieved and stored in a main index, a word list, together with links (index identifiers) to the appropriate index tables. A search is first performed in the main index, retrieving the index table identifier holding the coordinates for e.g. the desired person(s) or companies. The index table provides immediate access to the rows in the content database containing the desired information. This information is instantly displayed, As in present online versions of telephone books one may e.g. type in a phone number and achieve access to the subscriber data or use address information to find a telephone number.

EXAMPLE 2

An example of an implementation of another embodiment of the present invention will now be described in relation to a known hierarchical category system. Information contained in an information space can also be grouped into a hierarchical category system with subcategories or topics, like in Yahoo. The further down in the hierarchy information can be placed, the easier to retrieve the desired information at a later stage, as the information is then more defined. Each category and subcategory is described by a word representative of the information, and which a user of the system would utilize if searching for that particular information, The route to a specific topic in the hierarchy created is described by the words naming the categories. E.g. Science>Space>Exploration>Missions>Moon>Apollo Project>Individual Missions>Apollo 11. In this manner different search strings are created. In this embodiment of the present invention all the words describing the different categories and subcategories/topics are assigned a number. Each search string possible is therefore represented by this number, which in the present invention is called an IMP number. The IMP number comprises in the present invention three digits separated by an x or full stop (.). Examples of different IMP numbers are shown in the list in FIG. 4. In FIG. 4 each row of numbers, e.g x001x012x002x001x005x002x003 in the first row, is an IMP number representing a particular search string consisting of 7 words. Each IMP number represents certain predefined information.

All the search strings possible, as just explained above, are input into the content database (FIG. 1), one word in each cell, each row in the database representing a search string as explained above. A part of such a content database is shown in FIGS. 5 and 6. Only the right part of the content database is shown in FIG. 5, whereas a left part of this particular content database is shown in FIG. 6. The search strings are also represented by a particular IMP number that appears in the rightmost column in FIG. 5. Each search string is read from the right to the left in FIGS. 5 and 6. Each added word to the string represents a narrowing of the information sought, as known from the prior art. The search strings are sorted sequentially in alphabetic order. It must however be noted that the same words may appear in different columns, as the same topics may be grouped in different categories.

The IMP numbers are shown in the column to the right in FIG. 5. Here, each three digit number is separated by a full stop (.), and each IMP number represents the search string seen on the same row to the left. The left side of the table is not shown in FIG. 5, meaning that search strings represented by IMP numbers with more than 3×3 digits are not shown in their entirety. Only a small number of words are shown, but the number can be increased indefinitely. Rows to can easily be deleted from and added to the content database. This is an advantage as e.g. URL addresses that do not longer exist, can easily be deleted from the system and new addresses easily added.

When performing a search, the user types in a number of words representing the topic the user is searching for, e.g. history moon landing. The combination of these three words represents a search string. It is assumed that a user starts by writing the area of which information is sought and then narrows the search by each added word. The order in which the words are written into the search string is therefore essential.

As can be seen from FIG. 6, all the cells of the database that have not been assigned a word are filled with <NULL>. The numbers shown in the upper row are x-coordinates and the number in the ID column are y-coordinates, meaning that each cell in the content table is represented by a (x,y) coordinate pair. The word landing has the position represented by the coordinate pairs x=19 and y=85, and x=19 and y=86 in the database shown in FIG. 6. As it is assumed that a user types in the search terms according to their relevance for the information sought, a search resulting in finding the last word in the input search string with the highest absolute value of x possible, is the information closest to the information desired by the user. In FIG. 6, a query including the word amphibious will have the search strings appearing in rows 85 and 86 as the most relevant result.

Indexes of locations for each word appearing in the content database partly shown in FIGS. 5 and 6, are created. An embodiment of such an index is shown in FIG. 7. In FIG. 7 the word landing's different coordinates in the content database are given. The x-coordinates are in the column named x, and the y-coordinates are in the column named y. The coordinate pairs (x, y) representing the cell in the content database in which the word landing appears, are positioned in the same row in the index in FIG. 7. From the index in FIG. 7, one finds that the word "landing" appears in the cells in the content database with the coordinate pairs (−19, 85), (−19, 86), (−18, 90) and (−18, 91). The minus indicates that the x-axis proceeds from the right to the left in the content database in FIG. 5.

Different indexes exist for the same word, taking into account that the same word may appear in different positions in the various search strings, The word landing may in one search string appear as the second word, and in another search string, from another user, the word landing may be input as the first word. A main index with all the words existing in the content database is therefore also created, an embodiment of which is shown in FIG. 8. In the column named "criteria" the words are inserted, one word in each cell. Each row, e.g. the highlighted row with id 112, contains information relating to the word "landing". The landing_1 in the firstref column denotes the index for the word "landing" when it appears as the first word in a search string. The index is shown in FIG. 9. Another index, landing_2, similar to the index shown in FIG. 9, exists for the word "landing" when it appears as the second word (secondref column) in a search string.

The firstref index tables, like the one shown in FIG. 9, are sorted according to the absolute value of the x-coordinates, as shown. In FIG. 7, the secondref index table is first sorted according to the absolute value of the x coordinates and secondly according to the y-coordinates.

A user of an electronic device on which a search in the information space above shall be performed, types in a string of words representing the desired information. E.g. the words: history landing.

First, the word "history" is looked up in the main index. Since the word occurs first in the search string, the firstref column is used to find the index table identifier. The index holding the (x, y) coordinate pairs for the word "landing" is then used for finding the coordinates of the word "history" in the content database. The word "landing" appears as the second word in the search string. The secondref column in the main index is therefore used in identifying the index for enquiring the coordinates for the word landing" in the content database. Index landing_2 is selected.

To have a hit, both the words "history" and "landing" must occur in the same search string in the content database, i.e. occur in the same row. When the coordinates for the first word "history" and the second word "landing" have been identified, the y coordinate values in the two selected indexes are compared. All coordinate pairs with the same y coordinate values are then selected. This group of hits is sorted according to the x coordinate values, finding the information considered most relevant for the user. The hit list may be displayed on a display device according to relevance, or the information in the list automatically opened and displayed for the user. If only the hit list is displayed, the user may choose the information to be opened. The hit list will display the pieces of data contained in all the chosen rows in the content database. This is believed to support the user in making the best choice possible. If none of the y coordinates for the words are identical, a calculation is performed for finding the information with the highest relevance.

The information is almost instantly presented for the user, with the most relevant information displayed first, also showing the search string picked as a result of the input words.

In the example above the search is only performed in categories. Accordingly, only the categories selected through the search procedure are displayed. This is called a category search. Only the information contained in the searched database is displayed. To be able to perform a meta search, the information contained in each category are also processed and structured as explained above. Assume a user types in the words "james brown". If these words cannot be found in the category database/index system, a search is performed in the database/index system for the records contained in each category. If such a record is found, the information represented by that particular record is immediately opened and presented to the user. This exemplifies another aspect of this special database/index structure. Data is retrieved and displayed according to the kind of information processed, structured and stored in the invented database/index system, whereas prior art systems perform searches and displays the search results according to the particular search engine used.

The searches are only performed in structured systems of databases and indexes, like the categories in Yahoo, or in any library system. Searches are not performed directly in the information existing in the information space. The searches are performed in advance when processing the information and creating the different indexes and content database. As the information contained in the information space may be regarded as represented by coordinates only, and in some embodiments also possibly by IMP numbers, any computation made by a processor for comparing, calculating relevance etc. is facilitated. The use of tables and coordinates, provide a search principle easily adaptable between languages in known ways.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

What is claimed is:

1. System for structuring digitally stored information, the system being included in a data processing system, the structuring system comprising:

a database comprising a number of cells arranged in rows and columns for holding pieces of data representing the information, wherein only one piece of data may be stored in each cell, the pieces of data contained in cells in one row of the database constituting a certain information;

an index table for each unique piece of data occurring in the database, each index table providing information concerning all locations of that unique piece of data in the database, wherein the locations are expressed by coordinates defining the cells in the database; and a main index listing once all the unique pieces of data in the database together with a corresponding index table identifier, the index table identifier providing a link to the corresponding index table for that particular piece of data.

2. System according to claim 1, wherein the coordinates are (x, y) coordinate pairs representing respectively the columns, a position of the piece of data in said column, and rows in the database.

3. System according to claim 2, wherein the coordinate pairs in the index tables are first sorted according to the absolute value of the x coordinates and second according to the value of the y coordinate.

4. System according to claim 3, wherein the pieces of data with the highest absolute values of x have a higher relevance than pieces of data with lower absolute values of x.

5. System according to claim 1, wherein each row in the database comprises an address/link to the digitally stored information represented by the pieces of data contained therein.

6. System according to claim 1, wherein the pieces of data contained in cells in one row in the database represents a search string associated with a URL address.

7. System according to claim 1, wherein the pieces of data contained in cells in one row in the database are associated with a file path.

8. System according to claim 1, wherein the digitally stored information represent a telephone directory.

9. Method in a data processing system for searching digitally stored information, the information being structured in a system according to claim 1, the method comprising:

inputting a desired information through an interface;

searching the main index table selecting pieces of data corresponding to the desired information and thereby selecting index tables;

searching the selected index tables selecting at least one location of a cell in the database containing the desired information; and selecting the row in the database in which the cell is located and retrieving the desired information.

10. Method according to claim 9, wherein the desired information being expressed in the form of a sequenced keyword search string, and wherein the method further comprises determining the order of the keyword in the sequence of keywords, and selecting index tables corresponding both to the desired information and the order of the keyword in the input search string.

11. Method according to claim 9, comprising inputting the desired information through a search engine interface.

12. Method according to claim 9, comprising displaying the retrieved information in a display device.

13. Computer program product for a data processing system, comprising a computer readable medium, having thereon:

computer readable program means, which when loaded into an internal memory of a data processing system, makes the data processing system perform the method in one of claim 10 or 19.

14. Method in a data processing system for structuring digitally stored information, the method comprising:

processing the information in a data processing unit and storing pieces of data representative of the information in cells in a database, the cells in the database being arranged in rows and columns, all the cells in the same row in the database constituting a certain information;

creating at least one index for each unique piece of data occurring in the database comprising information of all locations of the unique piece of data in the database;

expressing the locations by coordinate values defining the cells in the database; and creating a main index listing once all the unique pieces of data occurring in the database together with a corresponding index identifier providing a link to the corresponding index for a unique piece of data.

15. Method according to claim 14, wherein the processing comprises indexing the stored information by using an indexing agent.

16. Method according to claim 14, wherein the coordinate values are (x, y) coordinate pairs representing the columns and rows, respectively, in the database.

17. Method according to claim 16, further comprising first sorting the coordinate pairs in the index according to the absolute values of the x coordinates and second according to the y coordinate values.

18. Method according to claim 14, wherein the processing the information and the arranging the pieces of data representative of the information in the database comprises processing and arranging such that pieces of data assigned high absolute values of the x coordinates are more descriptive for the represented information than pieces of data assigned lower absolute values of the x coordinates.

19. Method according to claim 14, wherein the pieces of data are keywords describing the digitally stored information.

20. Method according to claim 19, wherein the keywords contained in cells in each row in the database constitute a search string, and wherein the method further comprises creating an index for each position a unique keyword occurs in the search strings, and creating a corresponding index identifier associated with the keyword in the main index.

21. Method according to claim 14, wherein a resource locator for the processed information is included in each row in the database, and wherein each resource locator provides a link to its corresponding digitally stored information.

22. Computer program product for a data processing system, comprising computer readable code means which, when loaded into an internal memory of a data processing system, makes the data processing system perform the method in one of claim 10 or 19.

* * * * *